United States Patent
Kupershmidt et al.

(10) Patent No.: US 8,832,267 B2
(45) Date of Patent: Sep. 9, 2014

(54) SYSTEM AND METHOD FOR ADAPTIVE BASELINE CALCULATION

(75) Inventors: Oleg Kupershmidt, Bedford, MA (US); Jason Joseph Spofford, Austin, TX (US)

(73) Assignee: CA, Inc., Islandia, NY (US)

( * ) Notice: Subject to any disclaimer, the term of this patent is extended or adjusted under 35 U.S.C. 154(b) by 206 days.

(21) Appl. No.: 13/569,050

(22) Filed: Aug. 7, 2012

(65) Prior Publication Data

US 2014/0047096 A1    Feb. 13, 2014

(51) Int. Cl.
| | | |
|---|---|---|
| *G06F 15/173* | (2006.01) | |
| *G06F 11/34* | (2006.01) | |
| *H04L 12/26* | (2006.01) | |

(52) U.S. Cl.
CPC ............... *G06F 11/34* (2013.01); *H04L 43/08* (2013.01)
USPC .......................................... 709/224; 719/318

(58) Field of Classification Search
CPC . G06F 11/34; G06F 11/3452; G06F 2201/86; H04L 43/08
USPC ........................... 709/223, 224, 250; 719/318
See application file for complete search history.

(56) References Cited

U.S. PATENT DOCUMENTS

| | | | |
|---|---|---|---|
| 6,182,022 B1 * | 1/2001 | Mayle et al. .................. | 702/182 |
| 7,216,063 B2 * | 5/2007 | Nguyen et al. ............... | 702/193 |
| 7,587,431 B1 * | 9/2009 | Rao et al. .............................. | 1/1 |
| 7,599,308 B2 * | 10/2009 | Laver et al. ................... | 370/252 |
| 7,877,472 B2 | 1/2011 | Sylor et al. | |
| 2011/0161048 A1 * | 6/2011 | Sodem et al. ................. | 702/181 |

* cited by examiner

*Primary Examiner* — Viet Vu
(74) *Attorney, Agent, or Firm* — Baker Botts, LLP (57) ABSTRACT

A method includes collecting, as data points, variable data associated with a monitored parameter. The method includes determining whether one or more of a first criterion and a second criterion is satisfied. The first and second criteria are satisfied based on a first quantity of the data points and a second quantity of data points in a selective subset of the data points, respectively. The method includes estimating an approximate baseline value for the monitored parameter in a first manner by utilizing each data point of a portion of the data points in response to determining that the first criterion is satisfied and the second criterion is not satisfied, and in a second manner by determining a second baseline value utilizing each data point of a portion of the selective subset of the data points in response to determining that the first criterion and the second criterion are both satisfied.

20 Claims, 5 Drawing Sheets

SYSTEM AND METHOD FOR ADAPTIVE BASELINE CALCULATION

BACKGROUND

The present disclosure relates to infrastructure and operations management and, more specifically, to a system and method for adaptive baseline calculation.

Baseline calculation generally deals with time series analysis in which data is collected and analyzed over time to determine a normal (e.g., accepted, expected, typical) level for a given environment. In known systems and methods, the result of a baseline calculation is used for trend charting and deviation from normal event generation, which alerts users when a currently monitored parameter falls outside of an established, acceptable range.

Existing products in such a performance management space usually have many different options for adjusting the manner of baseline calculation. A primitive case is based on a 30 day moving average. In a more advanced case, users are allowed to specify a time window (e.g., 6 weeks) during which the baseline is calculated using data points corresponding to a particular hour on a specific day of the week (e.g., 11:00 AM on Tuesdays, which would allow averaging over 6 Tuesdays in the case of a 6 week time window). In other cases, vendors allow users to change a granularity of a baseline calculation. For example, a coarse granularity baseline calculation may involve calculating an average temperature for every 1 hour interval over a particular time period, whereas a fine granularity baseline calculation may involve calculating an average temperature for every 5 minute interval over the particular time period. In such other cases, users may make a selection to increase the resolution of the average data over the particular time period by increasing the granularity of the baseline calculation from the coarse granularity to the fine granularity, such that a greater quantity of data points are collected and a greater number of baseline calculations are performed over the particular time period.

BRIEF SUMMARY

According to an aspect of the present disclosure, a method may comprise collecting, as a plurality of collected data points, variable data received through an input device and associated with a monitored parameter. Each data point of the plurality of collected data points may comprise a value of the monitored parameter at a particular time. The method may comprise determining, in response to collecting and adding a new data point to the plurality of collected data points, whether a first criterion is satisfied. The first criterion may be satisfied based on whether the plurality of collected data points comprises at least enough data points to estimate an approximate baseline value for the monitored parameter. The method may comprise determining, in response to collecting and adding the new data point to the plurality of collected data points, whether a second criterion is satisfied. The second criterion may be satisfied based on whether a selective subset of the plurality of collected data points comprises at least enough data points to estimate the approximate baseline value in a more accurate manner. The method may comprise estimating an approximate baseline value for the monitored parameter in a first manner comprising determining a first baseline value for the monitored parameter utilizing each data point of a portion of the plurality of collected data points in response to determining that the first criterion is satisfied and the second criterion is not satisfied. The method may comprise estimating the approximate baseline value for the monitored parameter in a second manner comprising determining a second baseline value for the monitored parameter utilizing each data point of a portion of the selective subset of the plurality of collected data points in response to determining that the first criterion and the second criterion are both satisfied. The approximate baseline value may approximate a typical value for the monitored parameter at the particular time.

Other objects, features, and advantages will be apparent to persons of ordinary skill in the art from the following detailed description and the accompanying drawings.

BRIEF DESCRIPTION OF THE DRAWINGS

Aspects of the present disclosure are illustrated by way of example and are not limited by the accompanying figures with like references indicating like elements.

DETAILED DESCRIPTION

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely in hardware, entirely in software (including firmware, resident software, micro-code, etc.) or in a combined software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would comprise the following: a portable computer diskette, a hard disk, a random access memory ("RAM"), a read-only memory ("ROM"), an erasable programmable read-only memory ("EPROM" or Flash memory), an appropriate optical fiber with a repeater, a portable compact disc read-only memory ("CD-ROM"), an optical storage device, a magnetic storage device, or any suitable combination of the foregoing. In the context of this document, a computer readable storage medium may be any tangible medium able to contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take a variety of forms comprising, but not limited to, electro-magnetic, optical, or a suitable combination thereof. A computer readable signal medium may be a computer readable medium that is not a computer readable storage medium and that is able to communicate, propagate, or transport a program for use by or in connection with an instruction execution system, apparatus, or device. Program code embodied on a computer readable signal medium may be transmitted using an appropriate medium, comprising but not limited to wireless, wireline, optical fiber cable, RF, etc., or any suitable combination of the foregoing.

Computer program code for carrying out operations for aspects of the present disclosure may be written in a combination of one or more programming languages, comprising an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider) or in a cloud computing environment or offered as a service such as a Software as a Service ("SaaS").

Aspects of the present disclosure are described herein with reference to flowchart illustrations and/or block diagrams of methods, apparatuses (e.g., systems), and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that, when executed, may direct a computer, other programmable data processing apparatus, or other devices to function in a particular manner, such that the instructions, when stored in the computer readable medium, produce an article of manufacture comprising instructions which, when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses, or other devices to produce a computer implemented process, such that the instructions which execute on the computer or other programmable apparatus provide processes for implementing the functions/acts specified in the flowchart and/or block diagram block or blocks.

While certain example systems and methods disclosed herein may be described with reference to infrastructure and operations management, and more specifically, information technology ("IT"), the systems and methods disclosed herein may be associated with one or more of IT service and asset management, security management, storage and recovery management, database management, application performance management in cloud computing, data management in cloud computing, metering/accounting in cloud computing, IT service and asset management in cloud computing, service assurance in cloud computing, virtualization in cloud computing, security in cloud computing, application performance management, and other technical areas. The systems and methods disclosed herein may be applicable to a broad range of activities that require or benefit from monitoring environmental parameters, such as, for example, industrial activities (e.g., power generation, manufacturing, refining, transportation, construction), commercial activities (e.g., sales, advertising, financial evaluation and modeling, inventory control), IT systems (e.g., performance monitoring, environmental monitoring, utilization monitoring, stress-testing, access control, provisioning services, bandwidth monitoring, packet-routing), and other activities of importance to the user.

Referring now to infrastructure and operations management systems, in existing systems baseline calculation may be quite complex and costly. Also, in a diverse environment in which new monitored targets (e.g., devices) randomly are added or removed, different quantities of historic data may be available for analysis of each monitored target. Consequently, a fairly precise estimate of a normal level of a monitored parameter for a monitored target may be made over time when the quantity of historic data corresponding to the monitored parameter is abundant; however, even a rough guess of the normal level of the monitored parameter for the monitored target may not be possible when the quantity of historic data corresponding to the monitored parameter is limited.

Further, existing systems may require that a user specify a fixed collection interval for collecting data corresponding to the monitored parameter. In existing systems, the fixed collection interval may be changed through user intervention. Consequently, the user may have to exert time and energy determining an appropriate collection interval and manually changing the collection interval. Moreover, when the user desires a specific baseline value (e.g., a baseline value for the temperature of a device on Tuesdays at 11:00 AM), the user may have to wait several weeks before a statistically significant baseline estimate may be determined.

When managing operations and infrastructure systems, a user may desire baseline values calculated in a manner, such that the baseline value may represent the normal behavior of a monitored environment as accurately as possible. Such a calculation may reduce false positives (e.g., a determination that a deviation from normal operation has occurred, but such a deviation from normal operation has not actually occurred) and false negatives (e.g., a determination that a deviation from normal operation has not occurred, but such a deviation from normal operation has actually occurred). Systems and methods disclosed herein may provide a means for accurately determining a baseline value by automatically performing calculations to determine the baseline value and adapting the calculations to determine more accurate baseline values as a quantity of historic data points increases. As used herein, the term: "automatically" indicates that a user interface may not be necessary to administer a system and method after the system and method is initially made operational. As used herein, the term: "adaptive" and derivatives thereof may indicate that a system or method initially performs a rough determination of a baseline value and later refines the accuracy of the baseline value by performing additional determinations of the baseline value over time as the quantity of historic data points increases. The baseline value may comprise, for example, one or more of an average value (e.g., in the same units as the monitored parameter), a typical variance, a typical standard deviation, a typical range, a mode, a typical skew, and any other statistical value that may provide useful information.

According to statistical theory, the accuracy of a baseline value may be increased as the number of data points is increased; however, in practical applications, 30 data points may be adequate. This beneficial change in accuracy that accompanies an increase in the available number of data points may not be limitless, however, and at some point the increase in the available number of data points may start to distort the accuracy of the baseline value. In particular, the increase in the available number of data points may distort the baseline value's representation of a normal value for the monitored parameter at a specified time of monitoring. For example, in a fast growing environment the number of concurrent users one year ago may not be related to the number of present concurrent users, and calculating a baseline value for the present number of concurrent users using the number of concurrent users one year ago may distort the baseline value (e.g., if a direct equal weighting of past behavior is implemented), such that the baseline value does not accurately represent a current normal value for the number of concurrent users. Further, as the frequency of data collection and storage increases, more options may become available for baseline calculation; however, such calculations may be expensive in terms of higher system resources consumption (e.g., CPU usage, memory usage, storage capacity).

Particular systems may employ time-weighted methods to calculate a baseline value, which may reduce distortions from outdated data. Nevertheless, such systems may still require a substantial number of data points to employ such time-weighted methods. Systems and methods disclosed herein may achieve similar or even more accurate baseline values using fewer data points, which may reduce the amount of processing power required to calculate a baseline value. Accordingly, the additional, unused processing power may be used to expand the ability of such systems and methods to monitor additional metrics or such systems and methods may be developed with less expensive processors.

Another way to improve baseline accuracy may be to recognize and incorporate into the baseline calculation repeating patterns of fluctuation in monitored variables, such as, for example, patterns based on time of the day or day of the week. For example, monitored network bandwidth utilization may spike in the morning of a work day when all employees check their email or at midnight when a scheduled backup job is run. In the case of network utilization example, comparing the utilization at, for example, 9:00 AM, when utilization spikes, with a baseline utilization value based on a utilization at, for example, 2:00 AM, when no one is using the network, or based on a utilization over the weekend, when the system load is minimal, may provide reduced-accuracy information that may not be useful.

In an example configuration, the system and method for calculating the baseline value may comprise, for example, three Accuracy Levels ("ALs"): a low AL, a medium AL, and a high AL. Nevertheless, in other configurations, the systems and methods may comprise 2 or more such levels. In the example configuration, a data point corresponding to the value of a monitored parameter may be collected once every hour. The low AL calculation may be initiated, for example, after 2 hourly data points have been collected and may be implemented until 7 days worth of hourly data points have been collected (e.g., 168 hourly data points). In the low AL calculation, a low-accuracy baseline value for the monitored parameter may be determined, for example, by averaging together the values of all of the collected hourly data points each time a new data point is collected. Consequently, the precision of the low-accuracy baseline value for the monitored parameter may increase as the number of hourly data points used to calculate the average of the parameter increases (e.g., as the sample size increases, the standard error of the calculated value decreases).

In the example configuration described above, the low AL calculation may terminate and the medium AL calculation may initiate in response to collecting 7 days worth of hourly data points. The medium AL calculation may be implemented until 7 weeks worth of hourly data points have been collected (e.g., 1176 hourly data points). In the medium AL calculation, a plurality of medium-accuracy baseline values for the monitored parameter may be determined, for example, by averaging together the values of collected hourly data points in a particular group of collected hourly data points each time a new data point is collected in the particular group. For example, the values of all of the collected hourly data points taken at 9:00 AM may be averaged each time a new data point is taken at 9:00 AM, such that the medium AL calculation may generate a calculated baseline value for the monitored parameter at 9:00 AM. The medium AL calculation may be repeated for the other hourly points in a day (e.g., 10:00 AM through 8:00 AM) to generate 24 medium-accuracy baseline values, each corresponding to a particular time of the day. Similarly to the low AL calculation, the precision of each of the medium-accuracy baseline values for the monitored parameter may increase as the number of hourly data points used to calculate the average of the parameter at a particular time increases.

In the example configuration described above, the medium AL calculation may terminate and the high AL calculation may initiate in response to collecting 7 weeks worth of hourly data points. The high AL calculation may be implemented thereafter. In the high AL calculation, a plurality of high-accuracy baseline value for the monitored parameter may be determined, for example, by averaging together the values of collected hourly data points in a certain group of the collected hourly data points each time a new data point is collected in the certain group. For example, the values of all of the collected hourly data points taken at 9:00 AM on a Tuesday may be averaged each time a new data point is taken at 9:00 AM on a Tuesday, such that the high AL calculation may generate a calculated baseline value for the monitored parameter at 9:00 AM on Tuesdays. The high AL calculation may be repeated for the other hourly points on Tuesdays (e.g., 10:00 AM through 8:00 AM on Tuesday) and all of the hourly points in each of the other days of the week (e.g., 9:00 AM through 8:00 AM on each of Wednesday through Monday) to generate 168 high-accuracy baseline values, each corresponding to a particular time of the day on a particular day of the week. Similarly to the low and medium AL calculations, the precision of each of the high-accuracy baseline values for the monitored parameter may increase as the number of hourly data points used to calculate the average of the parameter at a particular time on a particular day increases.

In the example configuration described above, the high AL calculation may not average more than 30 hourly data points together to calculate a high-accuracy baseline value (e.g., each certain group of hourly data points may not exceed 30 data points). Accordingly, after 31 data points have been collected for the certain group, the oldest collected data point in the certain group may not be used to calculate the high-accuracy baseline value (e.g., the oldest collected data point in the certain group may be discarded). After 30 data points are included in the calculation of an average, the increase in precision associated with adding additional data points may become nominal. Accordingly, setting an upper limit for the number of data points that may be included in the calculation of the high-accuracy baseline value may reduce the number of resources (e.g., memory, computational power, time) required for the high AL calculation, with little effect on precision.

The example configuration described above is merely an example and should not be construed to limit the scope of the disclosure. Other configurations of the example may exist that have two ALs or more than three ALs. Further, the values described in the example configuration may be different than the values described above. In certain configurations of the example, for example, the low AL calculation may begin after 30 hourly data points have been collected, rather than 2 hourly data points. In some configurations of the example, the low AL calculation may not average more than 30 hourly data points together to calculate a low-accuracy baseline value. In some configurations of the example, the low AL calculation may not terminate in response to collecting 7 days worth of hourly data points. In some configurations of the example, the medium AL calculation may initiate, for example, in response to collecting 14 days worth of hourly data points. Many combinations of threshold values may be used that trigger the transition from a low AL to a medium AL and from a medium AL to a high AL.

In systems and methods disclosed herein, an initial baseline value for a monitored parameter (e.g., a baseline value based on an average of the values of the collected data points for the monitored parameter, without further distinguishing the data points, in the example configuration described above) may be calculated faster (e.g., after collecting 2 hourly data points in slightly more than a one hour period, as disclosed in the example configuration described above) than a more-detailed baseline value for the monitored parameter (e.g., a baseline value based on an average of the values of the collected data points for the monitored parameter that are part of a particular subset of the collected data points, such as data points collected at 9:00 AM on Tuesdays, without further distinguishing the data points, in the example configuration described above) that may be calculated from data points that are collected less frequently (e.g., collecting two data points in the subset of data points collected at 9:00 AM on Tuesdays, as disclosed in the example described above, may require slightly more than a one week period or slightly more than a 168 hour period). Thus, while the systems and methods disclosed herein ultimately may calculate a more-detailed baseline value, which may be a more-accurate baseline value, over a long-term period using a rich set of data collected over the long-term period, the systems and methods disclosed herein initially may calculate a less-detailed baseline value, which may be a less-accurate baseline value, over a short-term period using a limited set of data collected during the short-term period.

Consequently, the systems and methods disclosed herein may enable vendors to demonstrate products comprising the systems and methods disclosed herein in a shorter amount of time than would otherwise be possible using a system or method that does not adaptively calculate baseline values based on the data that has been collected. This may be advantageous in sales situations and lead to faster sales. In addition, from a customer's perspective, the systems and methods disclosed herein may provide a customer with quick initial results that may allow the customer to implement technology incorporating the systems and methods disclosed herein almost immediately, with the knowledge that the calculated baseline value may become more-detailed, and potentially more accurate, as additional time passes and more data points are collected.

As the systems and methods disclosed herein collect more data over time, the systems and methods disclosed herein may establish a normal level for a monitored parameter (e.g., CPU utilization, number of concurrent users, number of dropped packets) with increased precision and, in many cases, increased accuracy. Consequently, technology implementing the systems and methods disclosed herein may progressively "get smarter" over time without expensive administrative intervention, such that the cost of ownership of technology implementing the systems and methods disclosed herein may be lower than the cost of ownership of technology that involves such administrative intervention. Moreover, because the system and methods disclosed herein may generate more-accurate baseline values for a monitored parameter over time, a number of false positive and false negative determinations of deviation from normal levels for the monitored parameter may be reduced, compared to systems and methods that do not adapt baseline calculations.

Returning to the example configuration described above, the system and method described in the example may collect a new data point for the monitored parameter at 9:00 AM on Tuesday. When the system and method described in the example has already collected a great number of data points for the monitored parameter (e.g., 30 weeks worth of hourly data or 5040 hourly data points), a user may prefer that the new data point is compared with a baseline value calculated from only hourly data points corresponding to 9:00 AM on Tuesdays because the user may believe that such a baseline value may more accurately represent a normal value for the monitored parameter than other combinations of data points. Nevertheless, such a calculation may require a plurality of data points, each of which may require a significant amount of time to acquire, and the user may prefer to have a baseline value within several hours, rather than in several weeks. Accordingly, while the user may prefer calculating a more precise and more accurate baseline value for the monitored parameter, the user may have a stronger preference for calculating a baseline value earlier in the data collection process. Consequently, the user may accept a rough calculation of the baseline value for the monitored parameter, which utilizes uses a reduced number of hourly data points (e.g., lower precision), and which does not distinguish between the time and date at which the hourly data points were collected (e.g., potentially lower accuracy), because such a calculation may be performed earlier in the collection process and the user has a stronger preference for receiving a baseline value, even if less accurate and less precise, earlier in the collection process. As more hourly data points are collected, the precision of the calculation may improve, and the system and method may adapt ultimately to calculate a baseline value for the monitored parameter utilizing a selective group of hourly data points (e.g., hourly data points for 9:00 AM on Tuesdays), which may generate a more accurate baseline value for the monitored parameter that may be compared with the recently-collected, new data point for the monitored parameter at 9:00 AM on Tuesday. In this manner, a user may see a very rough baseline calculated by averaging two data points for the past two hours, and as time progresses this baseline may be refined and move closer to what may be normal for the monitored parameter in the monitored environment (e.g., greater accuracy).

Figure 1:
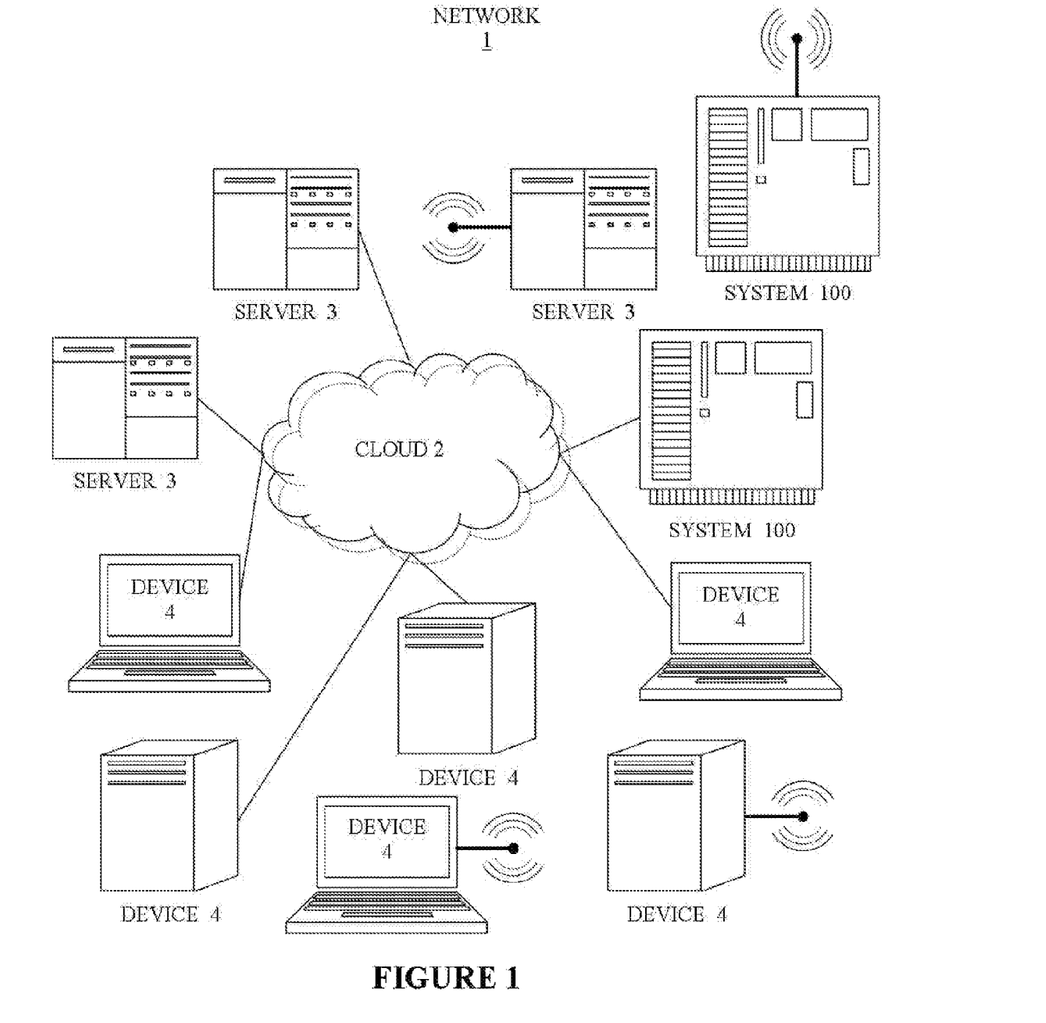
FIG. 1 is a schematic representation of a network monitored by a device that performs an adaptive baseline calculation.

Referring now to FIG. 1, a network 1 for transmitting and receiving information and for provisioning services now is described. Network 1 may comprise one or more clouds 2, which may be public clouds, private clouds, or community clouds. Each cloud 2 may permit the exchange of information and services among users that are connected to such clouds 2. In certain configurations, cloud 2 may be a wide area network, such as the Internet. In some configurations, cloud 2 may be a local area network, such as an intranet. Further, cloud 2 may be a closed, private network in certain configurations, and cloud 2 may be an open network in other configurations. Cloud 2 may facilitate wired or wireless communications of information and provisioning of services among users that are connected to cloud 2.

Network 1 may comprise one or more servers 3 and other devices operated by service providers, information providers, and other parties. Network 1 also may comprise one or more devices 4 utilized by service consumers, information consumers, and other parties. Service providers and information providers may provide information and services to information consumers and service consumers utilizing the one or more servers 3, which connect to the one or more devices 4 via cloud 2. The services may comprise, for example, information technology services, financial services, business services, access services, monitoring services, operations services, infrastructure services, and other resource-provisioning services. Servers 3 may comprise, for example, one or more of general purpose computing devices, specialized computing devices, mainframe devices, wired devices, wireless devices, monitoring devices, infrastructure devices, and other devices configured to provide one or more of services and information to information consumers and service consumers. Devices 4 may comprise, for example, one or more of general purpose computing devices, specialized computing devices, mobile devices, wired devices, wireless devices, passive devices, routers, switches, mainframe devices, monitoring devices, infrastructure devices, and other devices utilized by service consumers and information consumers.

Moreover, network 1 may comprise one or more system 100 that may monitor and collect information from and about devices 4, servers 3, and other devices connected to cloud 2. System 100 may be, for example, one or more of a general purpose computing device, a specialized computing device, a wired device, a wireless device, a mainframe device, an infrastructure device, a monitoring device, and any other device configured collect variable data from one or more data sources (e.g., servers, sensors, networks, other devices). System 100 may connect to cloud 2 and monitor servers 3, devices 4, and other devices connected to cloud 2 for available information from or about servers 3, devices 4, and other devices connected to cloud 2 and available information (e.g., performance information, access information, user information, physical conditions, error information, location and geography, ambient conditions, efficiency, associated costs, utilization, availability, other variable information) about the services and information provided from service providers and information providers. By monitoring servers 3, devices 4, and other devices connected to cloud 2 and collecting variable data associated with servers 3, devices 4, and other devices connected to cloud 2, system 100 may generate rich datasets regarding operational parameters and conditions for servers 3, devices 4, other devices connected to cloud 2, and other systems, events, services, and processes monitored by such devices. System 100 may utilize these data sets to establish baseline levels of performance and environmental conditions (e.g., normal or accepted behavior and conditions) for servers 3, devices 4, other devices connected to cloud 2, and other systems, events, services, and processes monitored by such devices. In this manner, system 100 may detect changes in servers 3, devices 4, other devices connected to cloud 2, and other systems, events, services, and processes monitored by such devices in response to the collected information deviating from the established baseline levels. In some configurations, one or more of a server 3 and a device 4 may comprise system 100. In other configurations, system 100 may be separate from servers 3 and devices 4.

Figure 2:
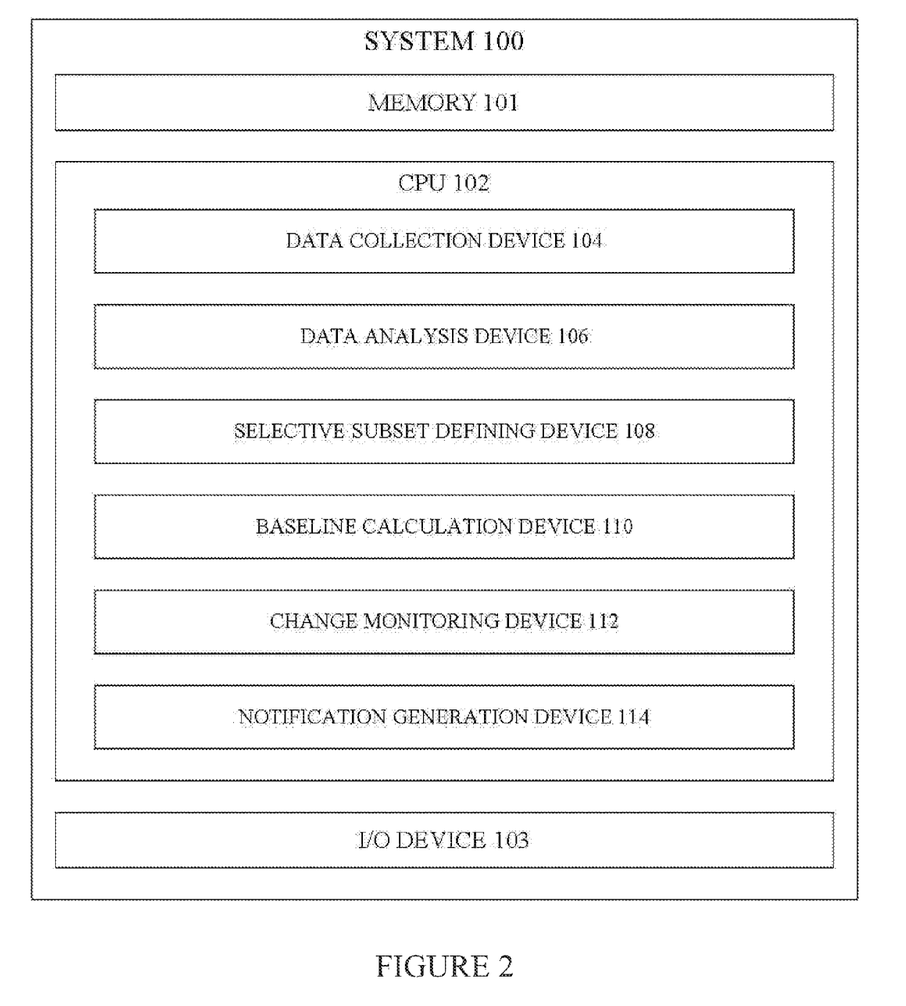
FIG. 2 is a schematic representation of a system configured to monitor certain parameters, perform an adaptive baseline calculation, and detect changes in the monitored parameters.

Referring now to FIG. 2, system 100, which that may monitor and collect data from servers 3, devices 4, other devices connected to cloud 2, and other devices connected with or incorporated into system 100 and perform an adaptive baseline calculation, now is described. System 100 may comprise a memory 101, a central processing unit ("CPU") 102, and an input and output ("I/O") device 103. Memory 101 may store computer-readable instructions that may instruct system 100 to perform certain processes. In particular, when executed by CPU 102, the computer-readable instructions stored in memory 101 may instruct CPU 102 to operate as one or more of a data collection device 104, a data analysis device 106, a selective subset defining device 108, a baseline calculation device 110, a change monitoring device 112, and a notification generation device 114. In particular configurations, one or more of data collection device 104, data analysis device 106, selective subset defining device 108, baseline calculation device 110, change monitoring device 112, and notification generation device 114 may be implemented on one or more different CPUs, which may be comprised in remote or local devices. I/O device 103 may receive one or more of data from cloud 2, data from other devices and sensors connected to system 100, input from a user and provide such information to CPU 102. I/O device 103 may transmit data to cloud 2, may transmit data to other devices connected to system 100, and may transmit a notification to a user (e.g., display a message, make a sound, send an email, make a telephone call). Further, I/O device 103 may implement one or more of wireless and wired communication between system 100 and other devices.

Figure 3:
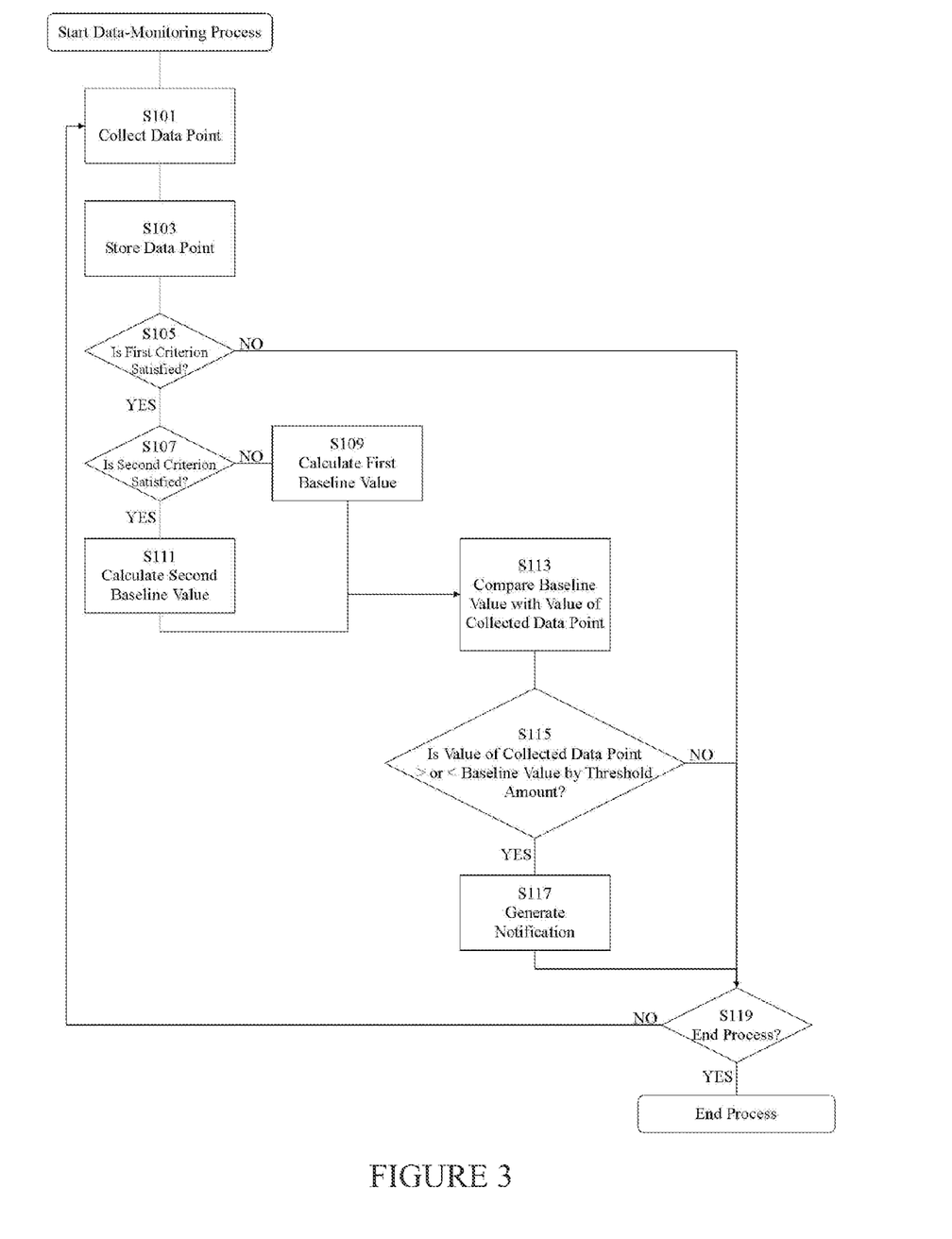
FIG. 3 illustrates a process of monitoring certain parameters, performing an adaptive baseline calculation for the monitored parameters, and detecting changes in the monitored parameters.

Referring now to FIG. 3, a process of monitoring certain parameters, performing an adaptive baseline calculation for the monitored parameters, and detecting changes in the monitored parameters (e.g., a data-monitoring process) now is described. In S101, data collection device 104 may collect variable data associated with one or more monitored parameter. Monitored parameters may comprise, for example, one or more of CPU utilization in a monitored device or for a particular service, number of concurrent users of a device, network, or service, number of dropped packets in a network or for a particular service or transmission, number of logins to a device, a network, or a service, internal or external temperature conditions, bank withdrawals and times thereof, system, network, or service availability, transmission rate of a packet, efficiency of a system, volatility, cost, position, utilization time, pressure, humidity, energy use or generation, and other parameters that may be of relevance or importance to a user of system 100. The variable data may be one or more of timedependent data, location-dependent data, and other data that may change. Data collection device 104 may collect data points at regular intervals (e.g., every second, every minute, hourly, daily, weekly, monthly, annually) or at irregular intervals (e.g., each time an event occurs, randomly), and each of the data points may comprise one or more of a value of the one or more monitored parameter, the time the data point was collected, the date on which the data point was collected, the location from which the data point was collected, and other information relevant to the collected data point. In addition, the data point may comprise one or more of a historical average of the value of the monitored parameter including the value of the monitored parameter comprised in the data point and the variance of the value of the monitored parameter comprised in the data point. In response to collecting a new data point, data collection device 104 may store the new data point, which may comprise the one or more of the value of the one or more monitored parameter, the time the data point was collected, the date on which the data point was collected, the location from which the data point was collected, events that were occurring when the data point was collected, and the other information relevant to the collected data point, in memory 101. Consequently, a plurality of collected data points may be stored in memory 101 over a period of time, such that memory 101 stores a plurality of stored data points.

In certain scenarios, data collection device 104 may be unable to collect a data point due to an impediment (e.g., malfunction, failure to connect to a sensor, power disruption, poor signal conditions, monitored parameter is too extreme for measurement). In such scenarios, data collection device 104 may continue collecting variable data after the impediment is overcome. Nevertheless, in certain configurations, data collection device 104 may request notification generation device 114 to notify a user or another device of the impediment in response to the occurrence of the impediment to variable data collection and in response to overcoming the impediment. Further, data collection device 104 may determine not to store corrupted data in memory 101 and request notification generation device 114 to notify a user or another device of such corrupted data.

After data collection device 104 collects a new data point and stores the new data point in memory 101, data analysis device 104 may analyze each of the data points stored in memory 101 to determine certain information about the variable data. In S105, data analysis device 106 may analyze the data points stored in memory 101 to determine whether a first criterion is satisfied. The first criterion may be, for example, based on a first predetermined quantity of data points stored in memory 101. For example, the first criterion may be that at least 2 data points have been collected and stored in memory 101, as described in the example configuration above. Nevertheless, in certain configurations, the first criterion may be that at least 1 data point has been collected and stored in memory 101. In other configurations, the first criterion may be based on a minimum predetermined quantity of collected and stored data points (e.g., at least the first predetermined quantity) that is greater than 2 data points. The first predetermined quantity of data points may be determined based on the minimum level of precision desired for the initial baseline calculations (described below). In certain configurations, the first criterion may be satisfied based on whether the plurality of collected data points comprises at least enough data points to estimate the approximate baseline value for the monitored (e.g., enough data points to estimate the approximate baseline value with at least a particular precision level). As the first predetermined quantity of data points is increased, the precision of the initial baseline calculation may increase, but the time required for establishing the initial baseline may increase. Accordingly, the first predetermined quantity may, for example, be input by a user or another device, may be defined in computer-readable program code, or may be determined by analyzing the plurality of stored data points.

In response to data analysis device 106 determining that the first criterion has not been satisfied (S105: NO), the process may proceed to S119 (described below). In response to data analysis device 106 determining that the first criterion is satisfied (S105: YES), the process may proceed to S107. In S107, data analysis device 106 may analyze the data points stored in memory 101 to determine whether a second criterion is satisfied. The second criterion may be, for example, based on a second predetermined quantity of data points in a selective subset of the data points stored in memory 101. In particular configurations, the second criterion may be satisfied based on whether a selective subset of the plurality of collected data points comprises at least enough data points to estimate the approximate baseline value in a more accurate manner. In certain configurations, the selective subset of the data points may be a predetermined subset of the data points with particular characteristics that are defined in the computer-readable instructions. In some configurations, the selective subset of the data points may be a subset of the data points with particular characteristics that are defined by a user or another device before or during the data-monitoring process disclosed herein. In other configurations, the selective subset of the data points may be defined by a selective subset defining device 108 during a selective subset defining process (described below, with reference to FIG. 4). In particular, the selective subset of the data points may be a subset of the data points stored in memory 101 that were, for example, collected at the same time on different days (e.g., 9:00 AM), collected on the same day of the week during different weeks (e.g., Tuesday), collected on the same day of the month during different months (e.g., the 15th of each month), collected on the same day of the year during different years (e.g., August 7), collected at the same time on the same day of the week (e.g., 9:00 AM on Tuesday), collected at the same location (e.g., in factory A), collected each time an event occurs (e.g., a football game), or some combination thereof. Thus, the pool of data points available in the selective subset may be less than the pool of data points available in memory 101. Moreover, in some configurations, a plurality of selective subsets of the data points stored in memory 101 (e.g., data points collected at 9:00 AM, data points collected at 10:00 AM, data points collected at 11:00 AM) may be defined. In certain configurations, the selective subset of the plurality of collected data points may be a group of data points in a predetermined pattern selected from the plurality of collected data points. The group of data points may comprise the most-recently collected data points. The selective subset of the plurality of collected data points may comprise fewer data points than the plurality of collected data points. The predetermined pattern may correspond to a periodic change in the variable data (e.g., daily changes, weekly changes, weekend to weekday changes).

Returning to the example configuration described above, the selective subset may be the subset of data points stored in memory 101 that were collected at 9:00 AM on different days of the week. With this selective subset, for example, the second criterion may be that at least 7 data points comprising values of the one or more monitored parameter collected at 9:00 AM have been collected and stored in memory 101, as described in the example configuration above. Nevertheless, in certain configurations, the first criterion may be based on a minimum predetermined quantity of collected and stored data points (e.g., at least the second predetermined quantity) that is different (e.g., fewer data points or more data points) from the value of 7 data points used in the above-described example. The second predetermined quantity of data points may be determined based on the tradeoff between the potentially increased accuracy of a baseline value determined using the selective subset of data points and the potentially decreased precision of the baseline value determined using fewer data points (e.g., because the pool of data points available in the selective subset may be less than the pool of data points available in memory 101). Accordingly, the second predetermined quantity may, for example, be input by a user or another device, may be defined in computer-readable program code, or may be determined by analyzing the plurality of stored data points.

In certain configurations, the analysis and determination processes in S105 and S107 may be performed concurrently. In other configurations, other processes may be performed between S105 and S107, such as, for example, a selective subset defining process (described below). In particular configurations, S105 may be omitted.

In response to data analysis device 106 determining that the second criterion has not been satisfied (S107: NO), the process may proceed to S109. In S109, baseline calculation device 110 may estimate an approximate baseline value for the monitored parameter in a first manner by calculating a first baseline value for the monitored parameter (e.g., a "lower-accuracy baseline value"). The approximate baseline value may approximate a typical value for the monitored parameter at a particular time (e.g., a time when the most recent data point was collected, a time specified by a user or a device, a particular hour, a particular day of the week, a particular day of the month, a particular season). Baseline calculation device 110 may perform a statistical calculation on a first set of values to determine the first baseline value. The statistical calculation may comprise, for example, one or more of averaging together each of value of the first set of values, determining a range of the first set of values, determining a median of the first set of values, and determining a mode of the first set of values. In some configurations, the statistical calculation may comprise an advanced statistical technique (e.g., regression, least-squares, time-series analysis, analysis of variance, time-weighted methods, determining percentage differences, determining percentage changes).

The first set of values may comprise the values of the one or more monitored parameters comprised by each data point of a portion of the data points stored in memory 101. The portion of the data points stored in memory 101 may comprise all of the data points stored in memory 101 or some quantity of data points that is less than all of the data points stored in memory 101. In some configurations, the portion of the data points stored in memory 101 may comprise a quantity of data points within a first predetermined range of data points (e.g., a quantity of data points that is greater than or equal to a first predetermined lower quantity of data points, such as 2 data points, and less than or equal to a first predetermined upper quantity of data points, such as 30 data points). In certain configurations, the portion of the data points stored in memory 101 may comprise a quantity of data points that is less than or equal to a first predetermined upper quantity of data points, such as, for example, 30 data points, without restricting the portion to a minimum number of data points. In other configurations, the portion of the data points stored in memory 101 may comprise one or more of data points that were collected during a particular time period (e.g., data points collected over the last two weeks, data points collected between Jul. 3, 2012, and Aug. 7, 2012), data points that were collected up to a particular date or time (e.g., data collected prior to 5:00 PM, data collected prior to Aug. 7, 2012), and data points that were collected after a particular date or time (e.g., data collected after 5:00 PM, data collected after Aug. 7, 2012). In the configurations described above, the portion of the data points stored in memory 101 may comprise one or more of data points that were most-recently collected (e.g., the most-recently collected 30 data points, the most-recently collected data points collected prior to 5:00 PM, the most-recently collected data points collected between Jul. 3, 2012, and Aug. 7, 2012), and data points that were successfully collected (e.g., not corrupted, properly stored). After calculating the first baseline value in S109, the process may proceed to S113 (described below).

In the configuration depicted in FIG. 3, baseline calculation device 110 may calculate the first baseline value for the monitored parameter in response to a determination that the first criterion has been satisfied and that the second criterion has not been satisfied. Nevertheless, in alternative configurations baseline calculation device 110 may calculate the first baseline value when a determination of whether the first criterion has been satisfied is not performed (e.g., as a default calculation) in response to a determination by data analysis device 106 that the second criterion has not been satisfied.

In the configurations described above, limiting the portion of the data points stored in memory 101 used to calculate the first baseline value to a finite number of points may reduce utilization of CPU 102 and improve efficiency. Further, limiting the portion of the data points stored in memory 101 used to calculate the first baseline value may limit the effects of longer-term patterns in the data and may help to make the first baseline value more accurate. Nevertheless, in certain configurations described above, because baseline calculation device 110 may use all consecutively-collected, viable data points stored in memory 101 within the portion to calculate the first baseline value, the first baseline value may be biased based on undetected patterns of variation in the data that occur over periods of time which are less than the period of time covered by the portion of the data points stored in memory 101.

In response to data analysis device 106 determining that the second criterion is satisfied (S107: YES), the process may proceed to S111. In S111, baseline calculation device 110 may estimate the approximate baseline value for the monitored parameter in a second manner by calculating a second baseline value for the monitored parameter (e.g., a "higher-accuracy baseline value"). Baseline calculation device 110 may perform a statistical calculation on a second set of values to determine the second baseline value. The statistical calculation may comprise, for example, one or more of averaging together each of value of the second set of values, determining a range of the second set of values, determining a median of the second set of values, and determining a mode of the second set of values. In some configurations, the statistical calculation may comprise an advanced statistical technique (e.g., regression, least-squares, time-series analysis, analysis of variance).

The second set of values may comprise the values of the one or more monitored parameters comprised by each data point of a portion of the selective subset of the data points stored in memory 101. The portion of the selective subset of the data points stored in memory 101 may comprise all of the data points stored in memory 101 within the selective subset or some quantity of data points that is less than all of the selective subset of the data points stored in memory 101. In some configurations, the portion of the selective subset of the data points stored in memory 101 may comprise a quantity of data points within a second predetermined range of data points (e.g., a quantity of data points that is greater than or equal to a second predetermined lower quantity of data points, such as 2 data points, and less than or equal to a second predetermined upper quantity of data points, such as 30 data points). In certain configurations, the portion of the selective subset of the data points stored in memory 101 may comprise a quantity of data points within the selective subset that is less than or equal to a second predetermined upper quantity of data points, such as, for example, 30 data points, without restricting the portion to a minimum number of data points. In other configurations, the portion of the selective subset of the data points stored in memory 101 may comprise one or more of data points within the selective subset that were collected during a certain time period (e.g., data points collected over the last two weeks, data points collected between Jul. 3, 2012, and Aug. 7, 2012), data points within the selective subset that were collected up to a certain date or time (e.g., data collected prior to 5:00 PM, data collected prior to Aug. 7, 2012), and data points within the selective subset that were collected after a certain date or time (e.g., data collected after 5:00 PM, data collected after Aug. 7, 2012). In the configurations described above, the portion of the selective subset of the data points stored in memory 101 may comprise one or more of data points within the selective subset that were most-recently collected (e.g., the most-recently collected 30 data points within the selective subset, the most-recently collected data points within the selective subset collected prior to 5:00 PM, the most-recently collected data points within the collected subset collected between Jul. 3, 2012, and Aug. 7, 2012), and data points within the selective subset that were successfully collected (e.g., not corrupted, properly stored). In general, an entirety of the selective subset of data points stored in memory 101 may comprise fewer data points than an entirety of the plurality of data points stored in memory 101 (e.g., the plurality of data points stored in memory 101 may comprise all of the selective subset of data points stored in memory 101, but the selective subset of data points stored in memory 101 may not comprise all of the plurality of data points stored in memory 101). After calculating the second baseline value in S111, the process may proceed to S113 (described below).

The second manner of estimating the approximate baseline value may determine an estimated approximate baseline value that is more accurate for a particular time than the approximate baseline value determined in the first manner because the second manner of estimating the approximate baseline value may not incorporate predictable fluctuation patterns in the variable data. For example, if the monitored parameter is utilization of network resources, the utilization of network resources may be much higher at 9:00 AM, when employees first check their email for the day, compared to 4:00 AM, when employees may be sleeping. Thus, a normal value for the utilization of network resources may always be lower at 4:00 AM than at 9:00 AM. Consequently, estimating approximate baseline values for utilization at 9:00 AM and 4:00 AM in the first manner by calculating a baseline value for each using, for example, all data points collected over a week may produce a baseline value that has a low accuracy at all times (e.g., estimates a baseline lower than normal at 9:00 AM and estimates a baseline higher than normal at 4:00 AM). Conversely, estimating the approximate baseline value for utilization at 9:00 AM and 4:00 AM in the second manner by calculating a baseline value for 9:00 AM using, for example, all data points collected at 9:00 AM, and calculating a baseline value for 4:00 AM using, for example, all data points collected at 4:00 AM may produce a baseline value that has a high accuracy at 9:00 AM and another baseline value that has a high accuracy at 4:00 AM. Consequently, estimating the approximate baseline value for the monitored parameter in the second manner may more accurately estimate the approximate baseline value than estimating the approximate baseline value for the monitored parameter in the first manner.

In the configuration depicted in FIG. 3, baseline calculation device 110 may calculate the second baseline value for the monitored parameter in response to a determination that both of the first criterion and the second criterion have been satisfied. Nevertheless, in alternative configurations baseline calculation device 110 may calculate the second baseline value when a determination of whether the first criterion has been satisfied is not performed in response to a determination by data analysis device 106 that the second criterion has been satisfied.

In the configurations described above, limiting the portion of the data points stored in memory 101 used to calculate the second baseline value to a finite number of points may reduce utilization of CPU 102 and improve efficiency. Further, limiting the portion of the data points stored in memory 101 used to calculate the second baseline value may limit the effects of longer-term patterns in the data (e.g., seasonal variations, multi-year effects) and may help to make the second baseline value more accurate. Further, in certain configurations described above, because baseline calculation device 110 may not use all consecutively-collected, viable data points stored in memory 101 within the portion (e.g., the data points stored in memory 101 that are not within the selective subset may not be used) to calculate the second baseline value, the second baseline value may not be biased based on patterns of variation in the data that occur over periods of time which are similar to a period of time on which the selective subset is based that may be less than the period of time covered by the portion. Accordingly, the second baseline value may more accurately reflect a normal value of the monitored parameter at the times, dates, or locations corresponding to the times, dates, or locations on which the selective subset is based, as compared with the first baseline value, which may incorporate values of data points collected at other times, dates, or locations.

In certain configurations, a plurality of selective subsets of the data points stored in memory 101 may be defined, and a second baseline value may be calculated for each selective subset of the plurality of selective subsets in response to collecting and storing a new data point within the each selective subset. Consequently, a plurality of second baseline values may be calculated that may correspond to a single first baseline value. For example, the first baseline value may be an average of all hourly data points collected over a week (e.g., 1 first baseline value based on 168 data points), while each of the plurality of second baseline values may be an average of all data points for a given hour collected over a week (e.g., 24 second baseline values, each based on 7 data points). Therefore, each second baseline value may more accurately reflect a normal value of the monitored parameter at the times, dates, or locations corresponding to the times, dates, or locations on which the respective selective subset is based, as compared with the first baseline value, which may incorporate values of data points collected at other times, dates, or locations.

In some configurations, selective subsets of the selective subsets may be defined and third baseline values may be calculated in response to a determination that a third criterion is satisfied. Additional levels of baseline calculation may be performed by iteratively defining further selective subsets and applying corresponding criteria. Each of these processes may be substantially similar to the processes of S107 and S111. Accordingly, further description of such processes is omitted.

In S113, change monitoring device 112 may compare the baseline value for the monitored parameter (e.g., the first baseline value or the second baseline value) calculated in S109 or S111 with the value of the monitored parameter comprised in the new data point collected and stored in memory 101. In S115, change monitoring device 112 may determine whether the value of the monitored parameter comprised in the new data point is greater than the baseline value for the monitored parameter by a particular threshold amount and whether the value of the monitored parameter comprised in the new data point is less than the baseline value for the monitored parameter by a certain threshold amount. In some configurations, the particular threshold amount and the certain threshold amount may be the same value. In other configurations the particular threshold amount and the certain threshold amount may be different values. The particular threshold amount and the certain threshold amount may, for example, be defined as one or more of differences (e.g., a difference between the value of the monitored parameter comprised in the new data point and the baseline value is greater than or less than a predetermined value), percentage differences (e.g., the percentage difference between the value of the monitored parameter comprised in the new data point and the baseline value is greater than or less than a predetermined value), and multiples (e.g., the value of the monitored parameter comprised in the new data point is less than one-third of the baseline value or is greater than 3 times the baseline value). In some configurations, change monitoring device 112 may determine only one of whether the value of the monitored parameter comprised in the new data point is greater than the baseline value for the monitored parameter by a particular threshold amount and whether the value of the monitored parameter comprised in the new data point is less than the baseline value for the monitored parameter by a certain threshold amount in S115. The determination made in S115 may be based on the monitored parameter being evaluated in S113 and S115. In response to a positive determination in S115 (S115: YES), change monitoring device 112 may determine that the monitored parameter is not at a normal level and the process may move to S117. In response to a negative determination in S115 (S115: NO), change monitoring device 112 may determine that the monitored parameter is at a normal level and the process may move to S119. Accordingly, when the baseline value for the monitored parameter is more accurate (e.g., closer to the true normal value of the monitored parameter, such as with the second baseline value), the number of false negative and false positive determinations about whether the monitored parameter is at a normal level may be reduced.

In S117, notification generation device 114 may generate a notification that indicates that the monitored parameter is has changed from the baseline value by at least the threshold amount. The notification may be, for example, one or more of a sound, an email, a displayed message, and a data transmission, which may inform the user or another device that the monitored parameter has changed and is not at a normal level. The process may move to S119 after generating the notification.

In S119, CPU 102 may determine whether the data-monitoring process is to be terminated. The data-monitoring process may terminate, for example, in response to the occurrence of a particular event or condition (e.g., in response to disconnection of a device generating the monitored parameter from cloud 2 or system 100, in response to a termination instruction, in response to the passage of a predetermined period of time, after collecting a predetermined quantity of data points, in response to not receiving data for a predetermined period of time, in response to an error in system 100, or in response to other events or conditions). In response to CPU 102 determining that the data-monitoring process is to be terminated (S119: YES), CPU 102 may end the data-monitoring process. In response to CPU 102 determining that the data-monitoring process is not to be terminated (S119: NO), the process may return to S101.

Figure 4:
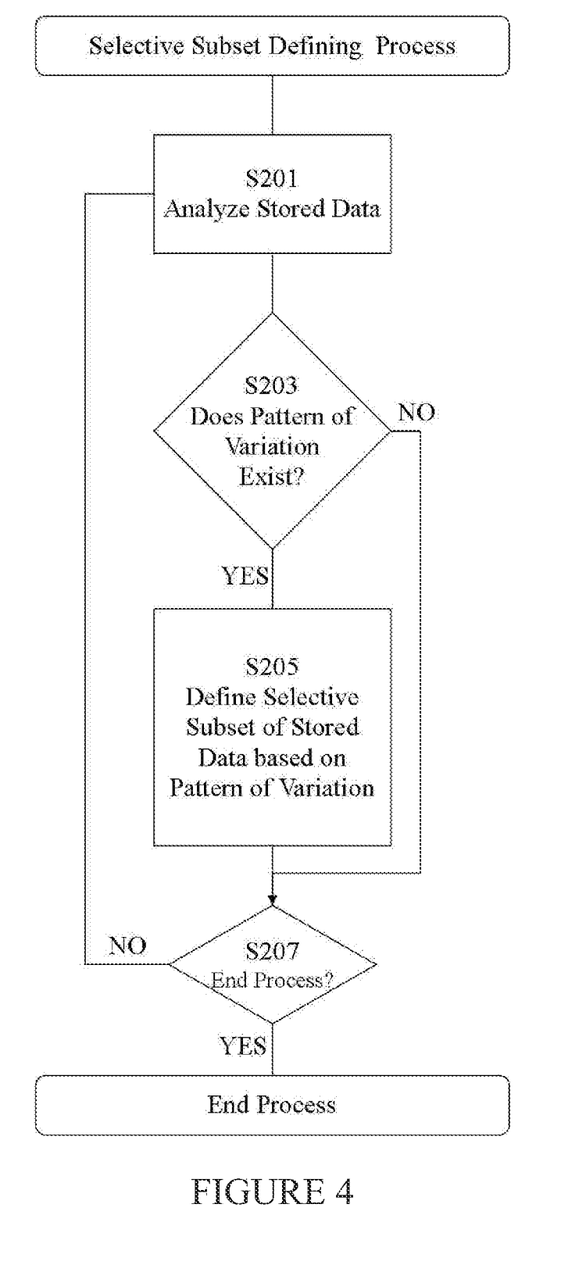
FIG. 4 illustrates a process of defining a selective subset of collected data points.

Referring now to FIG. 4, a process of defining a selective subset of the data points stored in memory 101 now is described. In the selective subset defining process, selective subset defining device 108 may define one or more selective subsets of the data points stored in memory 101 to be used in S107 for determining whether the second criterion is satisfied and for calculating one or more second baseline values in S111. By effectively defining selective subsets of the data points stored in memory 101, system 100 may calculate accurate second baseline values that better represent normal levels for a monitored parameter.

In S201, data analysis device 106 may analyze all of or a portion of the data points stored in memory 101 to determine whether one or more pattern of variation exists in the value of the monitored parameter comprised in the stored data points (e.g., periodic patterns, such as an increase in temperature of at least 5 degrees Celsius every Tuesday at 9:00 AM). Data analysis device 106 may use a variety of statistical methods to detect patterns of variation in the value of the monitored parameter comprised in the stored data points. In some configurations, for example, data analysis device 106 may determine an expect range of variation that would still be considered normal or determine an expect variation based on periodic patterns of time and the most recent variation due to general trending over time (e.g., projection). In certain configurations, for example, data analysis device 106 may determine other patterns in time series data beyond periodic variations, such as, for example, an unexpected pattern like "on every full moon", or correlating where two devices may be interdependent and may affect each other. In response to data analysis device 106 determining that a pattern of variation exists for the value of the monitored parameter comprised in the stored data points (S203: YES), selective subset defining device 108 may define a selective subset of the data points stored in memory 101 based on the pattern of variation, and the process may move to S207. In some configurations, selective subset defining device 108 may define the selective subset to comprise all data points stored in memory 101 positioned similarly in the pattern (e.g., all stored data points at the peaks of periodic increases or all stored data points at the troughs of periodic decreases). In other configurations, selective subset defining device 108 may define the selective subset to comprise all data points stored in memory 101 positioned similarly in the pattern that were collected within a certain period of time. The certain period of time may be predetermined, specified, or determined by analyzing the stored data points. Further, selective subset defining device 108 may use information stored in memory 101 with the data points, such as time or date of collection, to group stored data points into selective subsets and to group newly-collected data points into the selective subsets.

Accordingly, a second baseline value calculated from such a selective subset of data points will more accurately reflect the normal value for the monitored parameter (e.g., it is normally warmer by at least 5 degrees Celsius on Tuesdays at 9:00 AM). Consequently, because the pattern of variation may be corrected for by sampling the appropriate selective subset of data points, it may be unlikely that future temperature readings collected on, for example, Tuesdays at 9:00 AM that are warmer by at least 5 degrees Celsius would trigger a change notification.

In response to data analysis device 106 determining that a pattern of variation does not exist for the value of the monitored parameter comprised in the stored data points (S203: NO), the process may proceed to S207. In S207, CPU 102 may determine whether the selective subset defining process is to be terminated. The selective subset defining process may terminate, for example, in response to the occurrence of certain events or conditions (e.g., in response to disconnection of a device generating the monitored parameter from cloud 2 or system 100, in response to CPU 2 receiving a termination instruction, in response to the passage of a predetermined period of time, in response to collecting a predetermined quantity of data points, in response to not receiving data for a predetermined period of time, in response to system 100 experiencing an error, in response to performing a certain number of analyses, in response to defining a certain number of selective subsets, or in response to other events or conditions). In response to CPU 102 determining that the selective subset defining process is to be terminated (S207: YES), CPU 102 may end the selective subset defining process. In response to CPU 102 determining that the selective subset defining process is not to be terminated (S207: NO), the process may return to S201.

In certain configurations, the selective subset defining process may be performed each time a new data point is collected. In some configurations, the selective subset defining process may be performed each time a predetermined number of data points have been collected. In other configurations, the selective subset defining process may be performed randomly. Further, the selective subset defining process may be performed at any time during the data-monitoring process described above (e.g., between S101 and S119).

In certain configurations, system 100 may not comprise change monitoring device 112 and notification generation device 114 and may not perform processes S113, S115, and S117. In some configurations, system 100 may not comprise selective subset defining device 108 and may not perform processes S201, S203, S205, and S207. In particular configurations, baseline values may be calculated every time a new data point is collected. In other configurations baseline values may be calculated less frequently (e.g., after 24 data points have been collected), but processes S113, S115, and S117 may be performed every time a new data point is collected.

In certain configurations, analysis device 106 may not perform processes S201 and S203, and these processes may be omitted. In such configurations, a user or another device may input a pattern of variation associated with a monitored parameter into system 101 or the pattern of variation may be defined in computer-readable code for executing the selective subset defining process. Consequently, one or more predetermined patterns of variation associated with one or more monitored parameters may be stored in memory 101. Accordingly, in such configurations, selective subset defining device 108 may, in S205, define a selective subset of the data points stored in memory 101 based on at least one of the one or more predetermined patterns of variation stored in memory 101, and the process may move to S207. Thus, the pattern of variation may, for example, be programmed or tuned into the implementation of the data-monitoring process, such that, during the data-monitoring process depicted in FIG. 3, system 100 may use this information about the one or more predetermined patterns of variation to selectively pick stored data points for a baseline calculation. In the examples disclosed above, selective subsets of the plurality of stored data points comprised the same hour of the day, the same day of the week, and the same hour of the same day of the week; however, many other patterns may be used to define selective subsets of the plurality of stored data points, such as, for example, one or more of the same day or selective days of the month, top of the hour, and times of low or high tide.

In certain configurations, a plurality of devices 4 may be added and removed from network 1. In such configurations, system 100 may determine baseline values for the monitored parameter in each device 4 of the plurality of devices 4. Further, in some such configurations, system 100 may use data points stored in memory 101 that were collected from several similar devices 4 of the plurality of devices 4 to determine baseline values for the monitored parameter in each device 4 of the plurality of devices 4. Accordingly, in response to adding a device 4 to network 1, a baseline value may be determined in a short period of time if other similar devices have been connected to network 1 at prior times, and the baseline value may have a higher accuracy, as compared with a baseline value determined in the short period of time without using the stored data points corresponding to similar devices.

Figure 5:
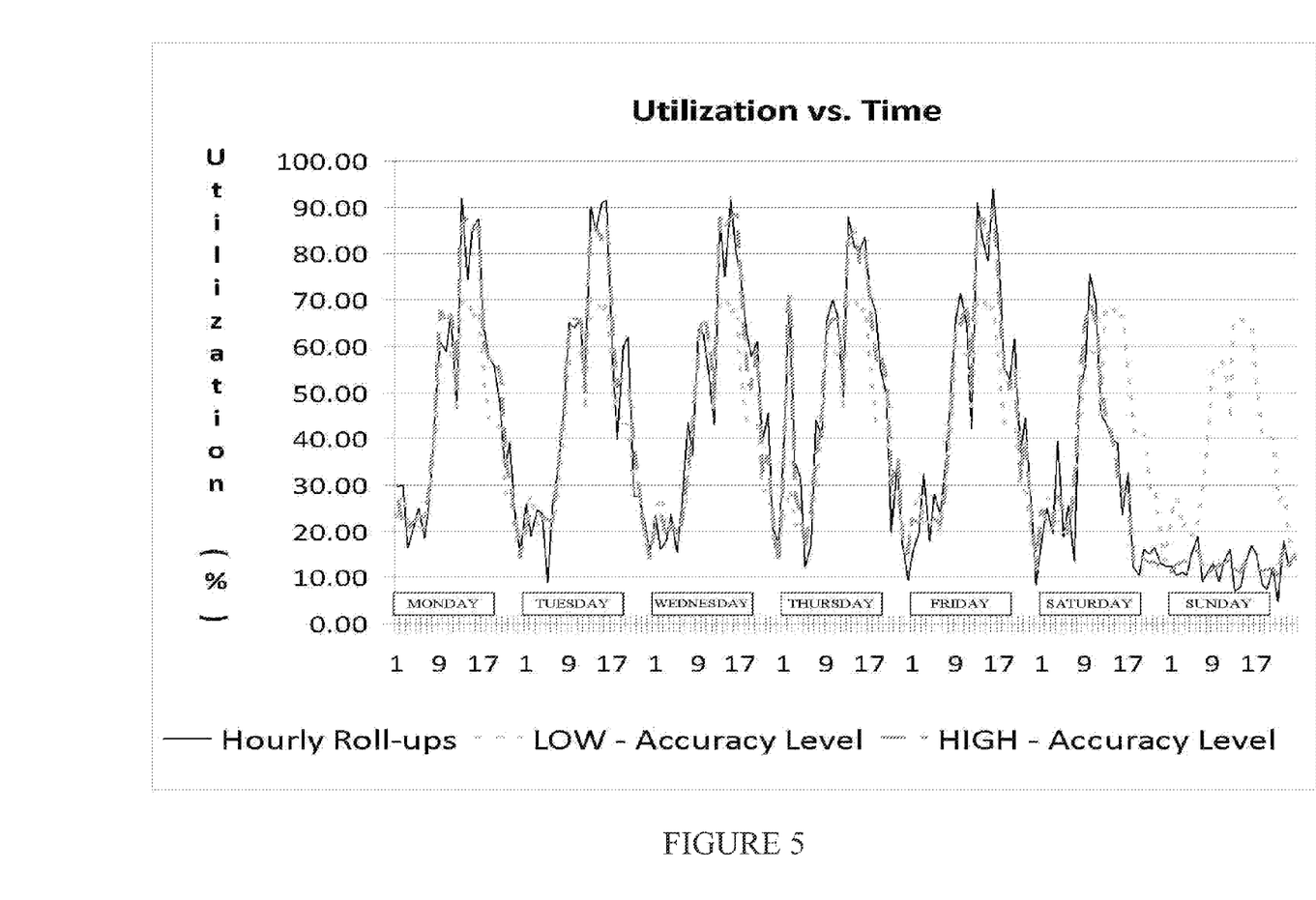
FIG. 5 is an example graphical representation of a utilization value over time, a low-accuracy baseline value over time, and a high-accuracy baseline value over time.

Referring now to FIG. 5, an example result of the process of FIG. 3 now is described. FIG. 5 may depict the results obtained from an example configuration of system 100 in which the utilization of a corporate network was monitored for five weeks, with data points collected hourly. FIG. 5 may depict the results from the fifth week. The corporation operating the corporate network may have office hours from 9:00 AM to 5:00 PM on weekdays and from 9:00 AM to noon on Saturdays and may be closed at other times, including Sunday. Further, heavy batch jobs may occur every Thursday at 2:00 AM. In the example configuration of system 100, the first criterion is satisfied if at least two data points have been collected for the same hour on different days (e.g., Monday and Tuesday), and the second criterion is satisfied if at least two data points have been collected for the same hour on the same day in different weeks (e.g., Monday of week 4 and Monday of week 5). Further the plurality of collected data points may comprise the same hourly data points collected on different days, and the selective subset of the collected data points may comprise the same hourly data points collected on the same day of the week during different weeks (e.g., the pattern of variation is weekly).

The solid line in FIG. 5 may depict the hourly roll-up of utilization (e.g., the value of utilization data collected each hour or an average of more frequently collected values of utilization data collected over the hour). The short-dashed line in FIG. 5 may depict a low-accuracy baseline level (e.g., daily data points) of utilization estimated (e.g., in the first manner) by system 3. The long-dashed line in FIG. 5 may depict a high-accuracy baseline level (e.g., weekly data points) of utilization estimated (e.g., in the second manner) by system 3. As depicted in FIG. 5, the low-accuracy baseline value of utilization generally may approximate closely the hourly roll-up of utilization for most of the day; however, the low-accuracy baseline value (e.g., the average value of utilization) may not approximate closely, for example, one or more of the hourly utilization detected at 2:00 AM on Thursday morning when a scheduled computer job, such as, for example, a backup, results in a utilization spike or the hourly utilization detected at the lowest utilization times on Sunday. Nevertheless, the high-accuracy baseline value of utilization may approximate closely the hourly roll-up of utilization for most of the day, including the peak utilization times for regularly scheduled computer jobs at 2:00 AM on Thursdays and the lowest utilization times on Sunday. Consequently, the high-accuracy baseline value may approximate utilization more accurately than the low-accuracy baseline value.

Accordingly, for example, system 3 may begin collecting data on a Monday. Then, after collecting data on Tuesday, system 3 may begin calculating the low-accuracy baseline depicted in FIG. 5 using two or more daily data points. After system 3 begins collecting data points on the following Monday, system 3 may begin calculating the high-accuracy baseline depicted in FIG. 5 using two or more weekly data points. Therefore, the accuracy of the approximate baseline value estimated by system 3 may increase as the quantity of collected data points increases.

The flowcharts and block diagrams in FIGS. 1-5 illustrate the architecture, functionality, and operation of possible implementations of systems, methods, and computer program products according to various aspects of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of means or step plus function elements in the claims below are intended to comprise any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. For example, this disclosure comprises possible combinations of the various elements and features disclosed herein, and the particular elements and features presented in the claims and disclosed above may be combined with each other in other ways within the scope of the application, such that the application should be recognized as also directed to other embodiments comprising other possible combinations. The aspects of the disclosure herein were chosen and described in order to best explain the principles of the disclosure and the practical application and to enable others of ordinary skill in the art to understand the disclosure with various modifications as are suited to the particular use contemplated.

What is claimed is:

1. A method comprising:

collecting, as a plurality of collected data points, variable data received through an input device and associated with a monitored parameter using a data collection device, each data point of the plurality of collected data points comprising a value of the monitored parameter at a particular time;

determining with a data analysis device, in response to collecting and adding a new data point to the plurality of collected data points, whether a first criterion is satisfied, wherein the first criterion is satisfied based on whether the plurality of collected data points comprises at least enough data points to estimate an approximate baseline value for the monitored parameter, the approximate baseline value approximating a typical value for the monitored parameter at the particular time when the new data point was collected;

determining with the data analysis device, in response to collecting and adding the new data point to the plurality of collected data points, whether a second criterion is satisfied, wherein the second criterion is satisfied based on whether a selective subset of the plurality of collected data points comprises at least enough data points to estimate the approximate baseline value in a more accurate manner;

estimating the approximate baseline value for the monitored parameter using a baseline calculation device in a first manner comprising determining a first baseline value for the monitored parameter utilizing each data point of a portion of the plurality of collected data points in response to determining that the first criterion is satisfied and the second criterion is not satisfied; and estimating the approximate baseline value for the monitored parameter using the baseline calculation device in a second manner comprising determining a second baseline value for the monitored parameter utilizing each data point of a portion of the selective subset of the plurality of collected data points in response to determining that the first criterion and the second criterion are both satisfied, wherein the first criterion is satisfied if the plurality of collected data points comprises at least a first predetermined quantity of collected data points, wherein the first criterion is not satisfied if the plurality of collected data points does not comprise at least a first predetermined quantity of collected data points, wherein the second criterion is satisfied if the selective subset of the plurality of collected data points comprises at least a second predetermined quantity of collected data points, wherein the second criterion is not satisfied if the selective subset of the plurality of collected data points does not comprise at least the second predetermined quantity of collected data points, and wherein the second predetermined quantity of collected data points are collected data points comprised in the selective subset of the plurality of collected data points that were collected during a certain time period.

2. The method of claim 1, further comprising:

defining the selective subset of the plurality of collected data points as a group of data points in a predetermined pattern selected from the plurality of collected data points comprising the new data point, the selective subset of the plurality of collected data points comprising fewer data points than the plurality of collected data points, and the predetermined pattern corresponding to a periodic change in the variable data, wherein estimating the approximate baseline value for the monitored parameter using the baseline calculation device in the second manner more accurately estimates the approximate baseline value than estimating the approximate baseline value for the monitored parameter using the baseline calculation device in the first manner.

3. The method of claim 1, further comprising:

defining the selective subset of the plurality of collected data points based on a predetermined pattern of variation in the variable data associated with the monitored parameter using a selective subset defining device.

4. The method of claim 1, further comprising:

analyzing the plurality of collected data points with the data analysis device to determine a pattern of variation in the variable data associated with the monitored parameter; and defining the selective subset of the plurality of collected data points based on the pattern of variation in the variable data associated with the monitored parameter using a selective subset defining device in response to determining the pattern of variation.

5. The method of claim 1, wherein the portion of the plurality of collected data points used to estimate the approximate baseline value for the monitored parameter in the first manner comprises each data point of the plurality of collected data points that were collected during a particular time period, wherein the portion of the selective subset of the plurality of collected data points used to estimate the approximate baseline value for the monitored parameter in the second manner comprises each data point in the selective subset of the plurality of collected data points that were collected during the certain time period, and wherein the certain time period is longer than the particular time period.

6. The method of claim 1, wherein determining the first baseline value for the monitored parameter comprises calculating a first average value for the monitored parameter by averaging together each value of the monitored parameter comprised in the portion of the plurality of collected data points, and wherein determining the second baseline value for the monitored parameter comprises calculating a second average value for the monitored parameter by averaging together each value of the monitored parameter comprised in the portion of the selective subset of the plurality of collected data points.

7. The method of claim 1, wherein collecting, as the plurality of collected data points, variable data received through the input device and associated with a monitored parameter further comprises collecting a time value corresponding to the particular time that each data point of the plurality of collected data points was collected, and wherein the selective subset of the plurality of collected data points comprises each data point of the plurality of collected data points collected at a same particular time on different days.

8. A system comprising:

a data collection device configured to collect, as a plurality of collected data points, variable data associated with a monitored parameter, each data point of the plurality of collected data points comprising a value of the monitored parameter at a particular time;

a data analysis device configured to:

determine, in response to collecting and adding a new data point to the plurality of collected data points, whether a first criterion is satisfied, wherein the first criterion is satisfied based on whether the plurality of collected data points comprises at least enough data points to estimate an approximate baseline value for the monitored parameter, the approximate baseline value approximating a typical value for the monitored parameter at the particular time when the new data point was collected; and determine, in response to collecting and adding the new data point to the plurality of collected data points, whether a second criterion is satisfied, wherein the second criterion is satisfied based on whether a selective subset of the plurality of collected data points comprises at least enough data points to estimate the approximate baseline value in a more accurate manner; and a baseline calculation device configured to:

estimate the approximate baseline value for the monitored parameter in a first manner by calculating a first baseline value for the monitored parameter utilizing each data point of a portion of the plurality of collected data points in response to determining that the first criterion is satisfied and the second criterion is not satisfied; and estimate the approximate baseline value for the monitored parameter in a second manner by calculating a second baseline value for the monitored parameter utilizing each data point of a portion of the selective subset of the plurality of collected data points in response to determining that the first criterion and the second criterion are both satisfied, wherein the first criterion is satisfied if the plurality of collected data points comprises at least a first predetermined quantity of collected data points, wherein the first criterion is not satisfied if the plurality of collected data points does not comprise at least a first predetermined quantity of collected data points, wherein the second criterion is satisfied if the selective subset of the plurality of collected data points comprises at least a second predetermined quantity of collected data points, wherein the second criterion is not satisfied if the selective subset of the plurality of collected data points does not comprise at least the second predetermined quantity of collected data points, and wherein the second predetermined quantity of collected data points are collected data points comprised in the selective subset of the plurality of collected data points that were collected during a certain time period.

9. The system of claim 8, further comprising:

a selective subset defining device configured to define the selective subset of the plurality of collected data points as a group of data points in a predetermined pattern selected from the plurality of collected data points comprising the new data point, the selective subset of the plurality of collected data points comprising fewer data points than the plurality of collected data points, and the predetermined pattern corresponding to a periodic change in the variable data, wherein estimating the approximate baseline value for the monitored parameter using the baseline calculation device in the second manner more accurately estimates the approximate baseline value than estimating the approximate baseline value for the monitored parameter using the baseline calculation device in the first manner.

10. The system of claim 8, further comprising:
a selective subset defining device configured to define the selective subset of the plurality of collected data points based on a predetermined pattern of variation in the variable data associated with the monitored parameter.

11. The system of claim 8,
wherein the portion of the plurality of collected data points used to estimate the approximate baseline value for the monitored parameter in the first manner comprises each data point of the plurality of collected data points that were collected during a particular time period, and
wherein the portion of the selective subset of the plurality of collected data points used to estimate the approximate baseline value for the monitored parameter in the second manner comprises each data point in the selective subset of the plurality of collected data points that were collected during the certain time period, and
wherein the certain time period is longer than the particular time period.

12. The system of claim 8,
wherein the baseline calculation device is configured to determine the first baseline value for the monitored parameter by averaging together each value of the monitored parameter comprised in the portion of the plurality of collected data points to determine a first average value for the monitored parameter, and
wherein the baseline calculation device is configured to determine the second baseline value for the monitored parameter by averaging together each value of the monitored parameter comprised in the portion of the selective subset of the plurality of collected data points to determine a second average value for the monitored parameter.

13. The system of claim 8,
wherein the data collection device is configured to collect a time value corresponding to the particular time that each data point of the plurality of collected data points was collected, and
wherein the selective subset of the plurality of collected data points comprises each data point of the plurality of collected data points collected at a same particular time on different days.

14. A computer program product comprising:
a computer readable storage medium having computer readable program code embodied therewith, the computer readable program code comprising:
computer readable program code configured to collect, as a plurality of collected data points, variable data associated with a monitored parameter, each data point of the plurality of collected data points comprising a value of the monitored parameter at a particular time;
computer readable program code configured to determine, in response to collecting and adding a new data point to the plurality of collected data points, whether a first criterion is satisfied, wherein the first criterion is satisfied based on whether the plurality of collected data points comprises at least enough data points to estimate an approximate baseline value for the monitored parameter, the approximate baseline value approximating a typical value for the monitored parameter at the particular time when the new data point was collected;
computer readable program code configured to determine, in response to collecting and adding the new data point to the plurality of collected data points, whether a second criterion is satisfied, wherein the second criterion is satisfied based on whether a selective subset of the plurality of collected data points comprises at least enough data points to estimate the approximate baseline value in a more accurate manner;
computer readable program code configured to estimate the approximate baseline value for the monitored parameter in a first manner comprising determining a first baseline value for the monitored parameter utilizing each data point of a portion of the plurality of collected data points in response to determining that the first criterion is satisfied and the second criterion is not satisfied; and
computer readable program code configured to estimate the approximate baseline value for the monitored parameter in a second manner comprising determining a second baseline value for the monitored parameter utilizing each data point of a portion of the selective subset of the plurality of collected data points in response to determining that the first criterion and the second criterion are both satisfied,
wherein the first criterion is satisfied if the plurality of collected data points comprises at least a first predetermined quantity of collected data points,
wherein the first criterion is not satisfied if the plurality of collected data points does not comprise at least a first predetermined quantity of collected data points,
wherein the second criterion is satisfied if the selective subset of the plurality of collected data points comprises at least a second predetermined quantity of collected data points,
wherein the second criterion is not satisfied if the selective subset of the plurality of collected data points does not comprise at least the second predetermined quantity of collected data points, and
wherein the second predetermined quantity of collected data points are collected data points comprised in the selective subset of the plurality of collected data points that were collected during a certain time period.

15. The method of claim 1, further comprising:
computer readable program code configured to define the selective subset of the plurality of collected data points as a group of data points in a predetermined pattern selected from the plurality of collected data points comprising the new data point, the selective subset of the plurality of collected data points comprising fewer data points than the plurality of collected data points, and the predetermined pattern corresponding to a periodic change in the variable data,
wherein the computer readable program code configured to estimate the approximate baseline value for the monitored parameter using the baseline calculation device in the second manner more accurately estimates the approximate baseline value than the computer readable program code configured to estimate the approximate baseline value for the monitored parameter using the baseline calculation device in the first manner.

16. The computer program product according to claim 14, further comprising:
computer readable program code configured to define the selective subset of the plurality of collected data points based on a predetermined pattern of variation in the variable data associated with the monitored parameter.

17. The computer program product according to claim 14, wherein the portion of the plurality of collected data points used to estimate the approximate baseline value for the monitored parameter in the first manner comprises each data point of the plurality of collected data points that were collected during a particular time period, and wherein the portion of the selective subset of the plurality of collected data points used to estimate the approximate baseline value for the monitored parameter in the second manner comprises each data point in the selective subset of the plurality of collected data points that were collected during the certain time period, and wherein the certain time period is longer than the particular time period.

18. The computer program product according to claim 14, wherein the computer readable program code configured to determine the first baseline value for the monitored parameter comprises computer readable program code configured to calculate a first average value for the monitored parameter by averaging together each value of the monitored parameter comprised in the portion of the plurality of collected data points, and wherein the computer readable program code configured to determine the second baseline value for the monitored parameter comprises computer readable program code configured to calculate a second average value for the monitored parameter by averaging together each value of the monitored parameter comprised in the portion of the selective subset of the plurality of collected data points.

19. The computer program product according to claim 14, wherein the computer readable program code configured to collect, as the plurality of collected data points, variable data received through the input device and associated with a monitored parameter further comprises computer readable program code configured to collect a time value corresponding to the particular time that each data point of the plurality of collected data points was collected, and wherein the selective subset of the plurality of collected data points comprises each data point of the plurality of collected data points collected at a same particular time on different days.

20. The computer program product according to claim 14, further comprising:

computer readable program code configured to analyze the plurality of collected data points with the data analysis device to determine a pattern of variation in the variable data associated with the monitored parameter; and computer readable program code configured to define the selective subset of the plurality of collected data points based on the pattern of variation in the variable data associated with the monitored parameter using a selective subset defining device in response to determining the pattern of variation.

* * * * *